Patented June 13, 1933

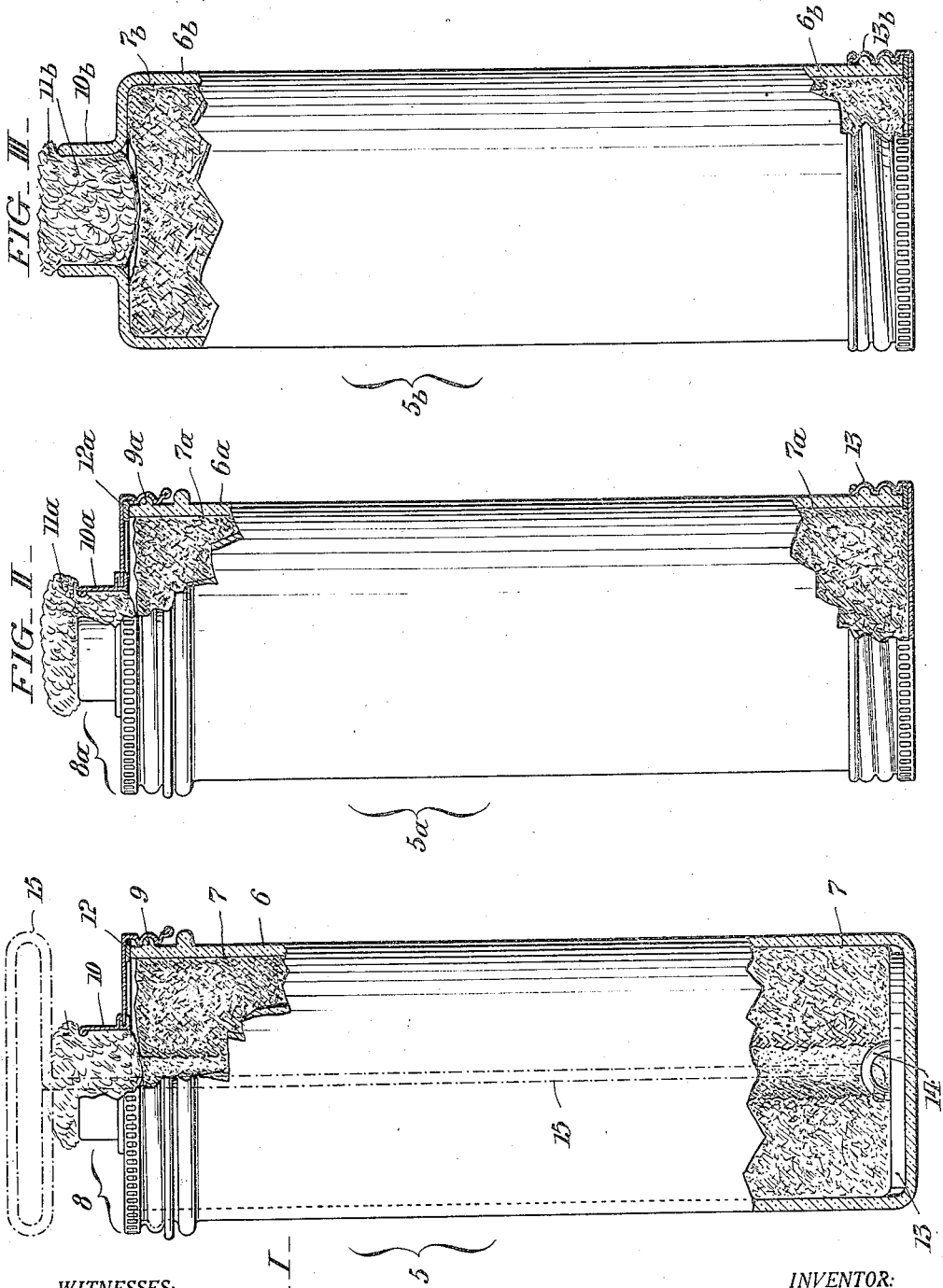

1,914,353

UNITED STATES PATENT OFFICE

GRANVILLE RAYMOND RETTEW, OF WEST CHESTER, PENNSYLVANIA, ASSIGNOR TO JOSEPH W. STRODE, FLOYD W. DIVINE AND GRANVILLE RAYMOND RETTEW, TRADING AS CHESTER COUNTY MUSHROOM LABORATORIES, OF WEST CHESTER, PENNSYLVANIA

RECEPTACLE FOR THE CULTURE OF MUSHROOM SPAWN AND THE LIKE

Application filed February 19, 1932. Serial No. 594,041.

This invention relates to receptacles for confining mushroom spawn and the like during the period of development.

Heretofore, it has been the custom to employ ordinary milk bottles for the indicated purpose, which were difficult to fill due to the necessity for packing material into them through their attenuated necks. Moreover, to subsequently recover the developed spawn intact, it was necessary to break the bottles; while if the spawn were broken up in order to get it out of a bottle, the resulting fragments would be irregular in size, with a large quantity of shreds or fines, and could not be handled and planted economically. Still other drawbacks of using milk bottles for mushroom spawn culture will appear hereinafter. Accordingly, the use of such bottles was exceedingly expensive, and therefore uneconomic in connection with mushroom culture.

In the main, my invention is directed toward overcoming the drawback just mentioned, through provision of a straight sided receptacle with a smooth interior which can be made as cheaply as the ordinary milk bottles heretofore used, and into which the material can be readily packed initially and removed intact after development without injury thereto or necessity for breaking the receptacle.

A further aim of my invention is to provide in connection with a receptacle having the above attributes means adapted to be placed therein incident to filling, by aid of which the subsequent removal of the spawn is greatly facilitated.

For the culture of mushroom spawn as here referred to, there is employed a culture-medium generally consisting of horse manure that has been suitably composted, washed, and shredded. It is then charged and packed into the receptacles used, through a sheet metal funnel or hopper whose short neck will just freely enter the mouth of the receptacle. When the receptacle is approximately full, a central hole or bore is drilled through the charge, about ¾ in. in diameter and extending practically to the bottom or closed end of the receptacle, and a porous plug of fibrous material like cotton wool is put in the mouth of the receptacle. A considerable number of such charged receptacles are themselves charged into one end of a large sterilizing drum, which is closed with a cover making a fluid-tight joint therewith. Steam at about 15 lbs. per sq. in. (gage) is turned into the drum long enough to assure complete sterilization of all the receptacles and their contents,—say for about four hours.

The drum in question is preferably built into a wall between the receptacle-charging and "inoculating" rooms of the laboratory or plant. The inoculating room is itself thoroughly sterilized (with formaldehyde or other disinfectant) before or while each batch of charged receptacles is disinfected in the drum, and is supplied with well filtered or sterilized air. When a sterilized batch of receptacles in the drum has cooled down, workers in sterilized gowns (such as used in surgical operating rooms) enter the inoculating room with a supply of "original" (as it is called) that has been carefully developed from germinated spores; shut themselves in; remove the cover on their end of the drum; and take out the (now sterile) receptacles with their charges of manure. The plug of fibrous packing is removed from the mouth of each receptacle, and its charge of manure is "inoculated" through the mouth or neck by putting two pieces of original (each about the size of a robin's egg) into its central bore, one near its inner end or bottom, and the other near its outer end. The manure at the outer end of the bore is crowded in around or over the upper piece of original, and the fiber plug is sterilized by holding it a moment in a bunsen gas flame, and is then replaced in the mouth of the receptacle. When all the receptacles in the sterilized batch have been thus dealt with, the inoculating room is opened, and the receptacles are removed to an incubating or growing room, whose temperature is suitably controlled. There they remain for about 28 days, until the thus developed mycelium has grown throughout the manure charge of each receptacle, which is determined by inspection of the receptacles from time to time.

The "spawn" (as the mycelium-permeated manure is called) is now ready to pack and ship to the mushroom grower, who breaks it up into small pieces and plants them separately in his mushroom-beds. The division is accomplished by breaking the unit of spawn grown in each receptacle into some nine slices, each of which is in turn broken into some half a dozen segments. Cutting of the spawn (as with a knife, for example) is avoided, because this would sever and kill many of the cells composing the fine threads of mycelium; whereas when the spawn is broken, mycelium cells at the region of fracture break apart uninjured. Pieces of the correct size are greatly to be preferred for planting, for various reasons.

In using milk-bottles for mushroom- spawn culture, there is considerable difficulty in filling or charging them, because of the relative smallness of their necks and of the funnel necks that can be used with them. The shredded manure has to be alternately worked in through the funnel-neck with a screw and compacted by ramming with a flat-ended stick about the size of a broomstick. Hence the charge in the receptacle is not evenly packed, but stratified into firm, cohesive layers, with planes of cleavage between them in the developed spawn. Hence the spawn unit from a milk-bottle tends to break into slices too thick to yield segments of spawn economically small for planting. Moreover, the spawn or mycelium develops in the mouth end of the bottle far more quickly than elsewhere, so that by the time the charge is fully permeated with mycelium, the mycelium in the mouth end of the bottle is undesirably over-developed.

By the use of my receptacle, all such drawbacks of prior practice are obviated. Through its open end, which opens to the full internal size of the main body portion, it is easily and quickly charged, without need for a corkscrew device to work in the manure; and it is equally easy to pack the manure uniformly in the receptacle, so that the spawn unit is uniformly cohesive, without planes of cleavage, and hence is easily broken into pieces of proper size. Through the unreduced open end, it is perfectly easy to withdrawn intact a spawn unit conformed to its interior, without the trouble and expense involved in breaking the receptacle. In incubation, the mycelium grows very evenly throughout the charge of manure, instead of being over-developed at one end of the unit or under-developed elsewhere,—or both. The spawn units can be removed from the receptacles at the laboratory or plant, before shipment to growers, so that the receptacles need not be shipped, and transportation charges on their weight are saved.

In the drawing, Fig. I is a view, partly in side elevation and partly in axial section, of a receptacle embodying the present improvements and suitable for the culture of mushroom spawn and the like.

Fig. II is a view similar to Fig. I showing an alternative embodiment of my invention; and Fig. III is likewise a view partly in elevation and partly in axial section, showing still another alternative embodiment of my invention.

With more detailed reference first to Fig. I of these illustrations, it will be noted that the type of receptacle therein delineated comprises a cylindric body component 5 which is closed at one end and characterized by having a straight side wall 6 and an absolutely smooth and uninterrupted interior surface 7. The body component is made preferably of non-metallic material such as glass, porcelain or other substance which lends itself readily to moulding or die pressing. To close the open end of the body component 5, I provide a cap-like closure member 8 which may be formed from sheet metal. This closure member 8 engages moulded screw threads 9 exteriorly of the open end of the body component 5, and, as shown, said closure member is formed with a diametrically-reduced axial neck 10 which affords an opening for insertion of a plug 11 of fibrous material, such as cotton for example, which will permit breathing of the mushroom spawn in the receptacle while protecting it from extraneous infection during development. A gasket 12 of cork or the like interposed between the nozzle-cap 8 and the mouth of the body component serves to render the juncture airtight.

By virtue of having straight sides and smooth interior, the body component 5 of the receptacle is easily filled and permits the removal of the spawn after development without injury to it, and without necessitating destruction of the receptacle. The receptacle of my invention is thus advantageous in that it can be used over and over again, and I acordingly effect a great saving in the cost of manufacture of mushroom spawn.

In order to facilitate the removal of the spawn, I not only provide the charge with an axial opening as shown in Fig. I, but I also (preparatory to filling the receptacle) place within the latter an extractor disk 13, which may be of metal, having a central lifting projection or eye 14. When the spawn is to be removed, I detach the closure member 8, and then insert a draw hook implement such as outlined in dot and dash lines at 15 in Fig. I, passing it down through the axial opening in the spawn and engaging the eye 14 of the disk 13. Obviously, by pulling on the implement 15, the spawn is removed intact from the receptacle with the utmost ease.

In the alternative form of Fig. II, the body component 5a of the receptacle is straight sided and internally smooth as in the first described embodiment, but open at both ends. A metallic closure member 8a similar to the closure member or nozzle-cap 8 of Fig. I is provided to close the body component 5a at one end, while the other end of said body component is protected by a screw cap 13 which is exactly like the closure 8a except for the omission of a diametrically reduced neck. The modified receptacle of Fig. II is adapted to be filled with a charge as shown, and it is advantageous in that it can be filled and emptied with equal facility from either end.

In the other alternative form of my invention shown in Fig. III, the body component 5b is integrally formed at one end with a diametrically reduced neck 10b to receive the plug 11b of fibrous packing; while the other end is open as in Fig. II and provided with a similar removable metallic closure cap 13b. A charge of the spawn in the receptacle of Fig. III can be readily removed by thrusting of a suitable rod or plunger through the diametrically-reduced neck 10b. As in Figs. I and II, the straight-sided body bore with its square ends (formed by the square-shouldered reduction around the neck 10b and by the cap 13) results in a spawn unit of substantially uniform size throughout its length, and affording the various practical advantages explained above.

Having thus described my invention, I claim:

1. An apparatus or receptacle for the culture of mushroom spawn and the like; said apparatus comprising a body of substantially straight-sided internal bore having a full-size open end, and internally smooth and unreduced toward said open end, so as to permit withdrawal therethrough intact of a spawn unit substantially uniform throughout its length conformed to the interior of the body, and also comprising a removable closure for said open end of said body; said apparatus, when otherwise closed, having at one end a substantially square-shouldered reduction with an aperture smaller than the interior of its body; and a porous plug or packing in said aperture permitting breathing of the spawn in the apparatus while protecting it from extraneous infection.

2. An apparatus or receptacle for the culture of mushroom spawn and the like, comprising a body having a full-size-open end, and internally smooth and unreduced toward said open end, so as to permit withdrawal therethrough intact of a spawn-unit conformed to the interior of the body; a removable closure for the latter having therein an aperture through which the contents of the receptacle may be inoculated with original; and a porous plug or packing in said aperture permitting breathing of the spawn while protecting it from extraneous infection.

3. An apparatus or receptacle for the culture of mushroom spawn and the like, comprising a body having a full-size-open end, and internally smooth and unreduced toward said open end, so as to permit withdrawal therethrough intact of a spawn-unit conformed to the interior of the body; a removable nozzle-cap having a short neck aperture through which the contents of the receptacle may be inoculated with original; and a porous plug or packing in said aperture permitting breathing of the spawn while protecting it from extraneous infection.

4. An apparatus or receptacle for the culture of mushroom spawn and the like, having a full-size-open end, and internally smooth and unreduced toward said open end, so as to permit withdrawal therethrough intact of a spawn-unit or charge conformed to the interior of the receptacle; in combination with an extractor disk for the other end of the receptacle, accessible through an axial opening in a spawn-charge to a draw device inserted through such spawn-charge-opening, and having means for hook-engagement with such draw device when the latter is inserted as aforesaid.

In testimony whereof, I have hereunto signed my name at West Chester, Pa., this 16th day of February 1932.

GRANVILLE RAYMOND RETTEW.